US009878813B2

(12) United States Patent
Eberhardt et al.

(10) Patent No.: US 9,878,813 B2
(45) Date of Patent: Jan. 30, 2018

(54) APPARATUS FOR TRANSPORTING A CONTAINER RELATIVE TO A FILLING STATION

(71) Applicant: Robert Bosch GmbH, Stuttgart (DE)

(72) Inventors: Albert Eberhardt, Ishofen (DE); Andreas Rappold, Satteldorf (DE); Dieter Bandtel, Buehlerzell (DE); Joachim Frangen, Heilbronn (DE); Jochen Ziegler, Satteldorf (DE); Jochen Peters, Crailsheim (DE); Markus Hanisch, Markgroeningen (DE); Oliver Ullmann, Satteldorf (DE); Sebastian Gran, Frankfurt am Main (DE); Stefan Junker, Leonberg (DE); Stefan Pfeiffer, Bamberg (DE); Ulrich Krauss, Ilshofen (DE); Werner Arleth, Esslingen (DE); Werner Runft, Winnenden (DE); Joshua Windsheimer, Satteldorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/329,237

(22) PCT Filed: Jun. 15, 2015

(86) PCT No.: PCT/EP2015/063307
§ 371 (c)(1),
(2) Date: Jan. 25, 2017

(87) PCT Pub. No.: WO2016/012160
PCT Pub. Date: Jan. 28, 2016

(65) Prior Publication Data
US 2017/0225814 A1    Aug. 10, 2017

(30) Foreign Application Priority Data

Jul. 25, 2014 (DE) .................. 10 2014 214 696

(51) Int. Cl.
*B65B 43/54* (2006.01)
*B65B 43/59* (2006.01)
(Continued)

(52) U.S. Cl.
CPC ............... *B65B 43/59* (2013.01); *B65B 3/24* (2013.01); *B65B 7/00* (2013.01); *B65B 65/02* (2013.01);
(Continued)

(58) Field of Classification Search
None
See application file for complete search history.

(56) References Cited

U.S. PATENT DOCUMENTS 3,780,847 A    12/1973  Faessler et al.
4,473,989 A *  10/1984  Tsutsumi ............... B65B 43/30
                                                141/166
(Continued)

FOREIGN PATENT DOCUMENTS

DE    102011085724    5/2013
EP         967150    12/1999
(Continued)

OTHER PUBLICATIONS

International Search Report for Application No. PCT/EP2015/063307 dated Aug. 14, 2015 (English Translation, 3 pages).

*Primary Examiner* — Kavel Singh
(74) *Attorney, Agent, or Firm* — Michael Best & Friedrich LLP

(57) ABSTRACT

The invention proposes an apparatus for transporting a container relative to a filling station, comprising at least one filling station (48) for filling at least one container (36), and also comprising at least one container mount (38) for transporting the container (36) relative to the filling station (48), characterized in that at least one drive surface (13) and (Continued)

at least one mover (20), which can be coupled in particular magnetically to the drive surface (13), are provided, wherein the mover (20) is arranged on the drive surface (13) such that it can be displaced and/or rotated in at least two degrees of freedom, and in that the container mount (38) is connected to the mover (20).

20 Claims, 7 Drawing Sheets

(51) Int. Cl.
*B65B 43/60* (2006.01)
*B65B 1/04* (2006.01)
*B65B 31/02* (2006.01)
*B65G 19/02* (2006.01)
*B65G 47/84* (2006.01)
*B65G 54/02* (2006.01)
*B65G 33/04* (2006.01)
*B65B 65/02* (2006.01)
*B65B 7/00* (2006.01)
*B65B 3/24* (2006.01)
*H02K 41/02* (2006.01)

(52) U.S. Cl.
CPC .......... *B65G 33/04* (2013.01); *B65G 47/846* (2013.01); *B65G 54/02* (2013.01); *H02K 41/02* (2013.01)

(56) References Cited

U.S. PATENT DOCUMENTS

| | | | |
|---|---|---|---|
| 4,789,016 A * | 12/1988 | Mihail | B65B 1/385 |
| | | | 141/143 |
| 9,617,019 B2 * | 4/2017 | Smith | B65B 1/02 |
| 2014/0047804 A1 * | 2/2014 | Evans | B65B 5/101 |
| | | | 53/473 |

FOREIGN PATENT DOCUMENTS

| | | |
|---|---|---|
| EP | 2420450 | 2/2012 |
| EP | 2589966 | 5/2013 |
| WO | 2011138448 | 11/2011 |
| WO | 2013098202 | 7/2013 |

\* cited by examiner

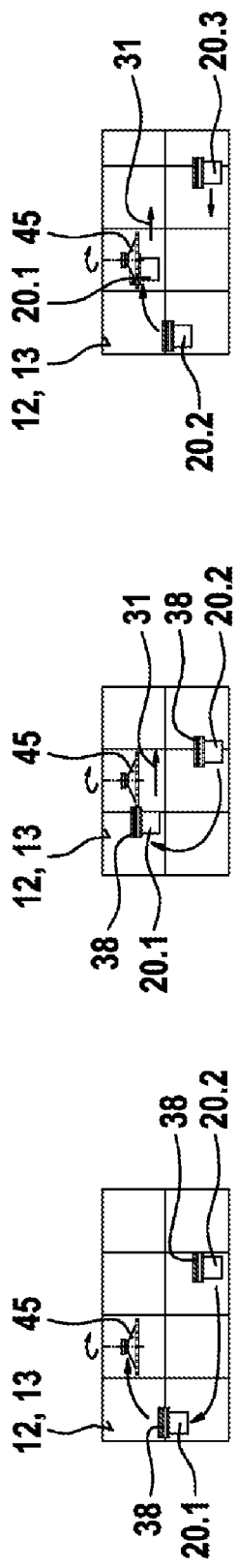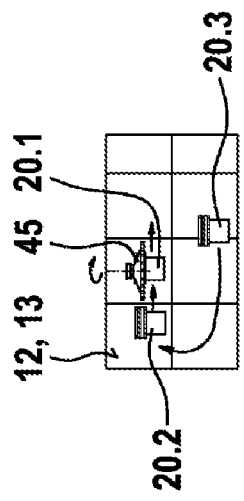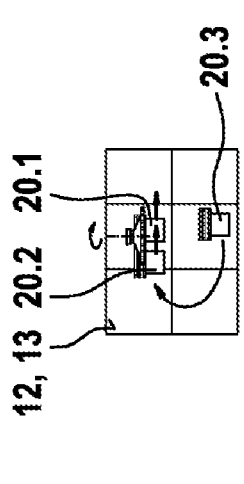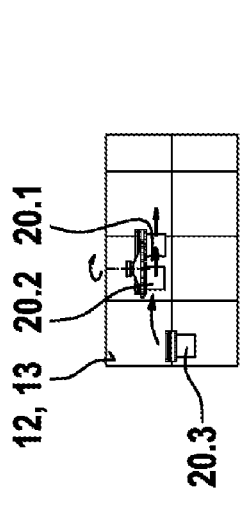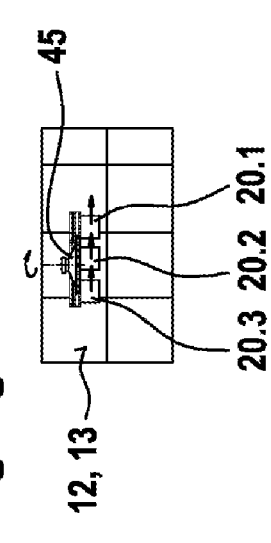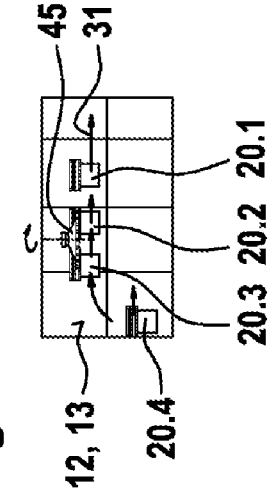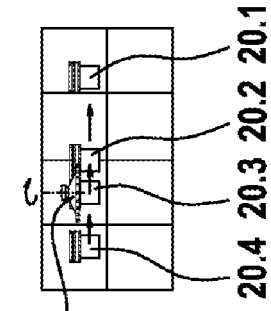

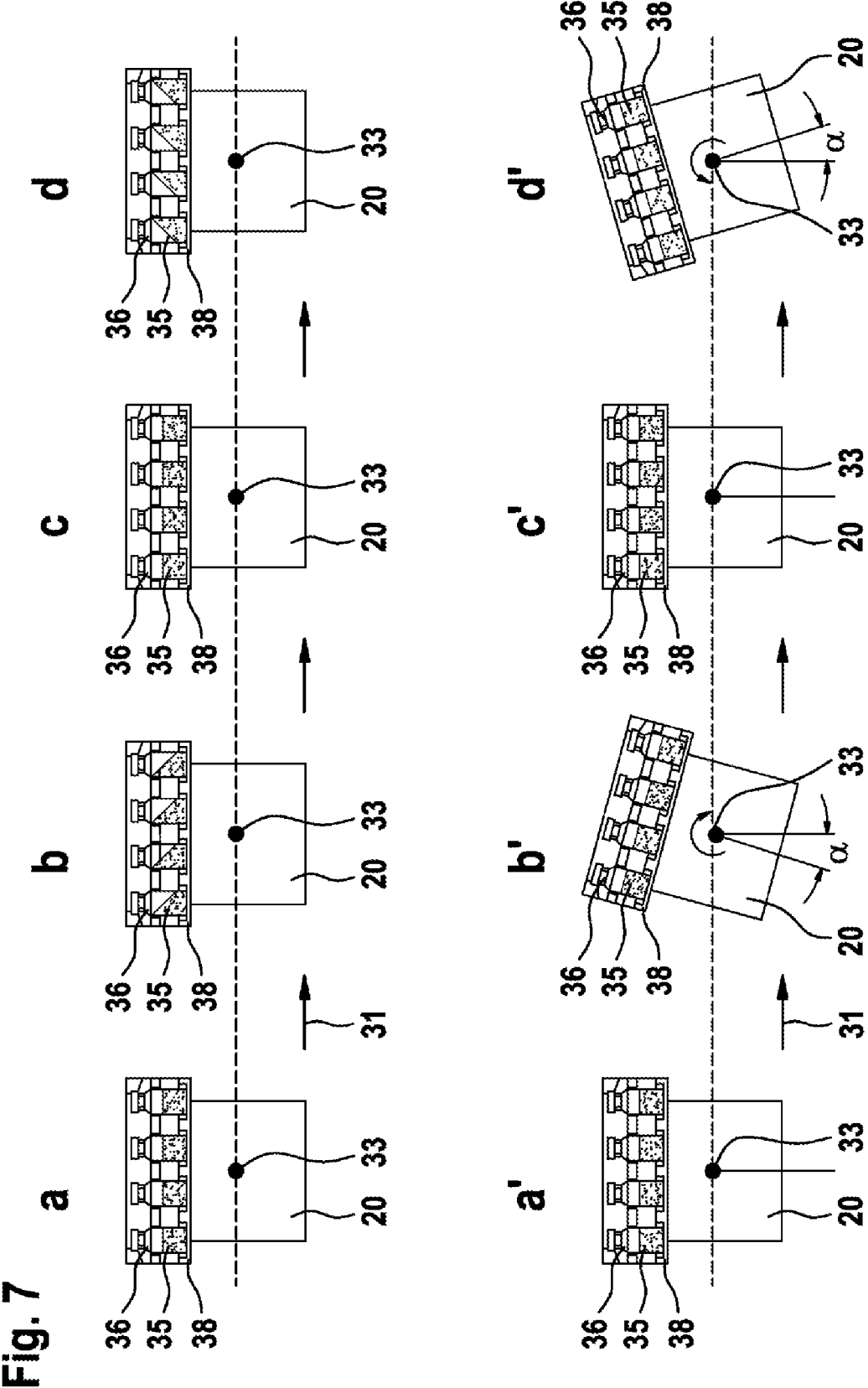

APPARATUS FOR TRANSPORTING A CONTAINER RELATIVE TO A FILLING STATION

BACKGROUND OF THE INVENTION

The invention proceeds from an apparatus for transporting a container relative to a filling station.

WO 2011/138448 already discloses a system for transporting containers between various stations, the containers being received in container carriers. The system includes a control unit which controls the transporting of the container carriers, a transporting surface which is divided into part surfaces and on which the container carriers can be movably arranged, and drive means, the drive means being actuated by means of the control unit and a respective drive means being associated with a respective part surface, a respective drive means being realized for the purpose of acting upon an associated container carrier with a drive force. Said system is distinguished by high degree of flexibility, as is required, in particular, for transporting sample containers of a laboratory analysis system.

The object underlying the invention is to optimize a transporting system for a filling station in a further manner.

The advantage of an apparatus according to the invention in contrast is that sequential process steps or fixed process steps are no longer necessarily required. By at least one drive surface and at least one mover which is couplable, in particular magnetically, to the drive surface being provided, and the mover being arranged on the drive surface so as to be displaceable in at least two degrees of freedom and/or rotatable and the container receiving means being connected to the mover, the containers can be supplied to and removed from the filling station in a particularly flexible manner. In addition, by means of said drive principle, the particle emissions or the abrasion produced by relative movements of otherwise required rollers, sliding elements or drive means are able to be reduced, as the mover can now be moved contactlessly relative to the drive surface on account of the magnetic coupling. This is advantageous precisely for pharmaceutical filling lines. In addition, the cleanability of the system is improved by just planar surfaces being necessary without the otherwise usual mechanical connections that are difficult to clean between the drive and the moved container transport. In addition, expenditure precisely on set-up or assembly of the processes to the filling station are reduced by the transport not always having to provide the containers at a fixed position. In addition, the service life is increased by reducing the number of wearing parts. In addition, fixed, unchangeable mechanical routes are avoided. Switching functions are no longer place-bound but can be established at arbitrary places inside the drive surface as a result of corresponding programming. The flexible drive concept with superposition of a rotational movement of the mover can have a direct influence on the sloshing behavior of a filled, but not yet closed container, by the mover, in an expedient further development, generating a rotational movement which counters the sloshing of the filled product. Apart from a targeted superposition of the linear movement of the mover with a rotational movement, no further additional mechanical movement means are necessary in order to reduce the sloshing of the filled product.

In an expedient further development, it is provided that the mover is rotated about a pivot point by an angle in relation to its rest position, wherein the angle depends in particular on a speed and/or the acceleration of the mover. Consequently, the preferred rotation can be determined in a simple manner by means of the known translatory speed or acceleration development.

In an expedient further development, it is provided that an inlet, which includes, in particular, at least one guide wheel and/or one conveying screw, is provided for supplying the containers, wherein the mover moves the container receiving means for taking over the supplied containers at the same speed as the inlet supplies the containers. As a result, the flexible actuation of the movement of the mover can also be applied in a particularly simple manner for receiving incoming containers without additional mechanical convertors or similar being necessary. The mover is consequently suitable precisely for transporting jobs around the container filling process.

In an expedient further development, it is provided that the inlet is arranged relative to the drive surface such that the inlet is in contact for supplying on one side of a container, whilst on another side of the container the container receiving means of the mover can move into contact with the containers for taking over the container supplied from the inlet. As a result, a simple transfer of the supplied containers to the mover can be achieved. In a particularly expedient manner, several movers are arranged next to one another for taking over the container supplied from the inlet. High speeds for supplying the containers can be transferred in a seamless manner to movers that are standing by. Several movers, which are arranged next to one another, are moved in a particularly expedient manner at the same speed for taking over the container supplied from the inlet for this reason.

In an expedient further development, it is provided that the container receiving means can receive several containers and/or the container receiving means is oriented longitudinally or transversely with respect to the direction of movement of the mover. As a result, the containers to be filled are able to be processed quickly in rows or lines, which increases the production rates of the apparatus.

In an expedient further development, the container receiving means is realized such that at least one container situated in the container receiving means is retained or released by means of a movement, in particular tilting, of the mover. As a result, a functionality of the releasing of a container, as can be necessary for weighing prior to or after the filling process, can be realized in a particularly simple manner just by means of a (rotational) movement without any additional further mechanisms.

In an expedient further development, it is provided that at least one process station such as a closing station and/or at least one weighing device and/or at least one inspection device and/or one inlet and/or one outlet is provided and the drive surface is developed such that the mover moves at least the container receiving means between the filling station and the process station. The process sequences can consequently be developed in a flexible manner by other stations being able to be approached in dependence on the state of the container. In particular in the case of unacceptable weighing results, the container can be moved to the filling station again for topping up, which is easily possible in the case of said drive concept on account of a freely-programmable route.

In an expedient further development, it is provided that the drive surface is realized as a vertical plane. As a result, relative movements that are typical precisely to the filling process, such as transport beneath the filling needles that are, as a rule, oriented vertically, can be realized in a simple manner. In a particularly preferred manner, the container receiving means is moved during the filling process. The filling needles can consequently be fixedly arranged without impairing the filling operation. The fixed arrangement of the filling needles has the effect of reducing particles as friction from the filling hoses or the like that would otherwise occur no longer occurs where the piping is fixed.

In an expedient development, it is provided that several movers, which are movable independently of one another, are provided. As a result, the process sequences can be developed in a flexible manner by other stations being able to be approached depending on the state of the container with high production rates.

Additional expedient further developments are produced from further dependent claims and from the description.

BRIEF DESCRIPTION OF THE DRAWINGS

Exemplary embodiments of the apparatus according to the invention are shown in the drawing and are described in more detail below, in which:

FIGS. 6a through 6i show the inlet situation with a planar drive in nine different states a to i and FIG. 7 shows movers with filled containers without and with special actuation in order to reduce sloshing of a product that has been filled in the container.

DETAILED DESCRIPTION

Figure 1:
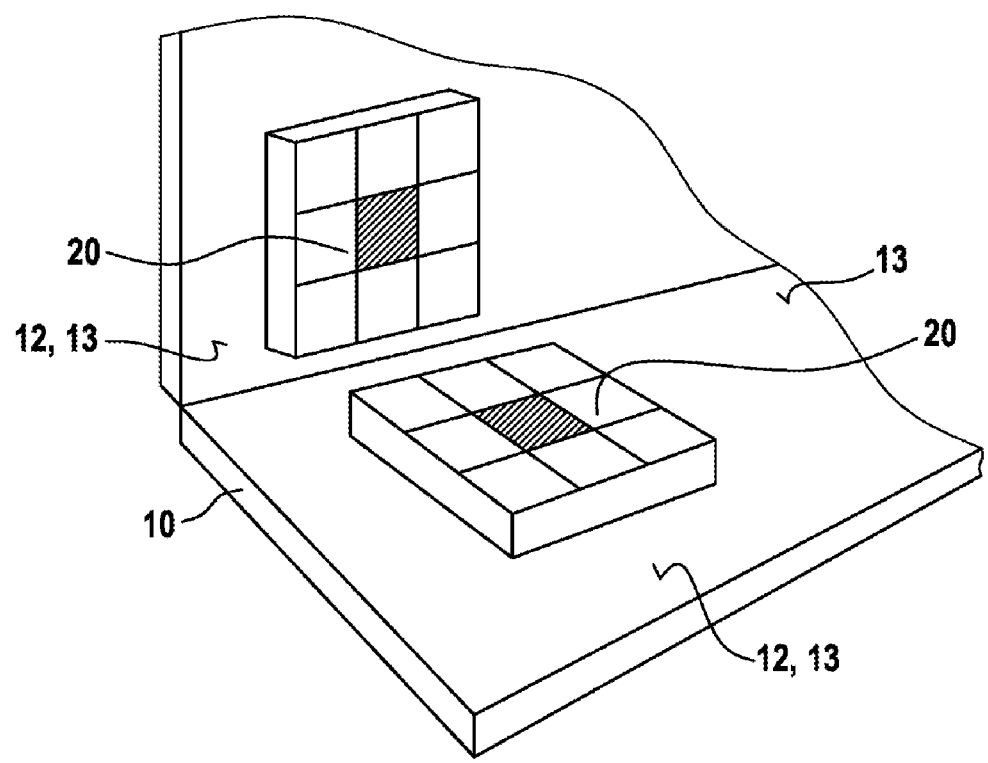
FIG. 1 shows both a passive mover module and an active mover module with a coil package for the power supply.

According to FIG. 1, a basic platform 10 includes a carrier plate 12 or a drive surface 13, on which at least one mover 20 is movably arranged. The mover 20, as a rule, is a passive mover 20 which preferably includes permanent magnets 19 which interact with coils on the carrier plate 12 or drive surface 13 for generating a relative movement. As an alternative to this, however, the mover 20 could also be actively driven, by the mover 20 including at least one coil package for supplying power which interacts in a suitable manner with means that produce a magnetic field (permanent magnets, coils) on the carrier plate 12 or drive surface 13 for generating a relative movement. FIG. 1 shows as an example the first carrier plate 12 or drive surface 13, which is realized as a horizontal plane, as well as a further carrier plate 12 or drive surface 13 which adjoins hereto and is realized as a vertical plane. The two movers 20 arranged hereon are also realized in a planar manner and interact with the respective drive surfaces 13 such that a preferably contactless movement of the movers 20 relative to the drive surface 13 is possible both in the plane of the drive surfaces 13 in at least two degrees of freedom as well as optionally a rotation about the normal of the drive surface 13.

Figure 2:
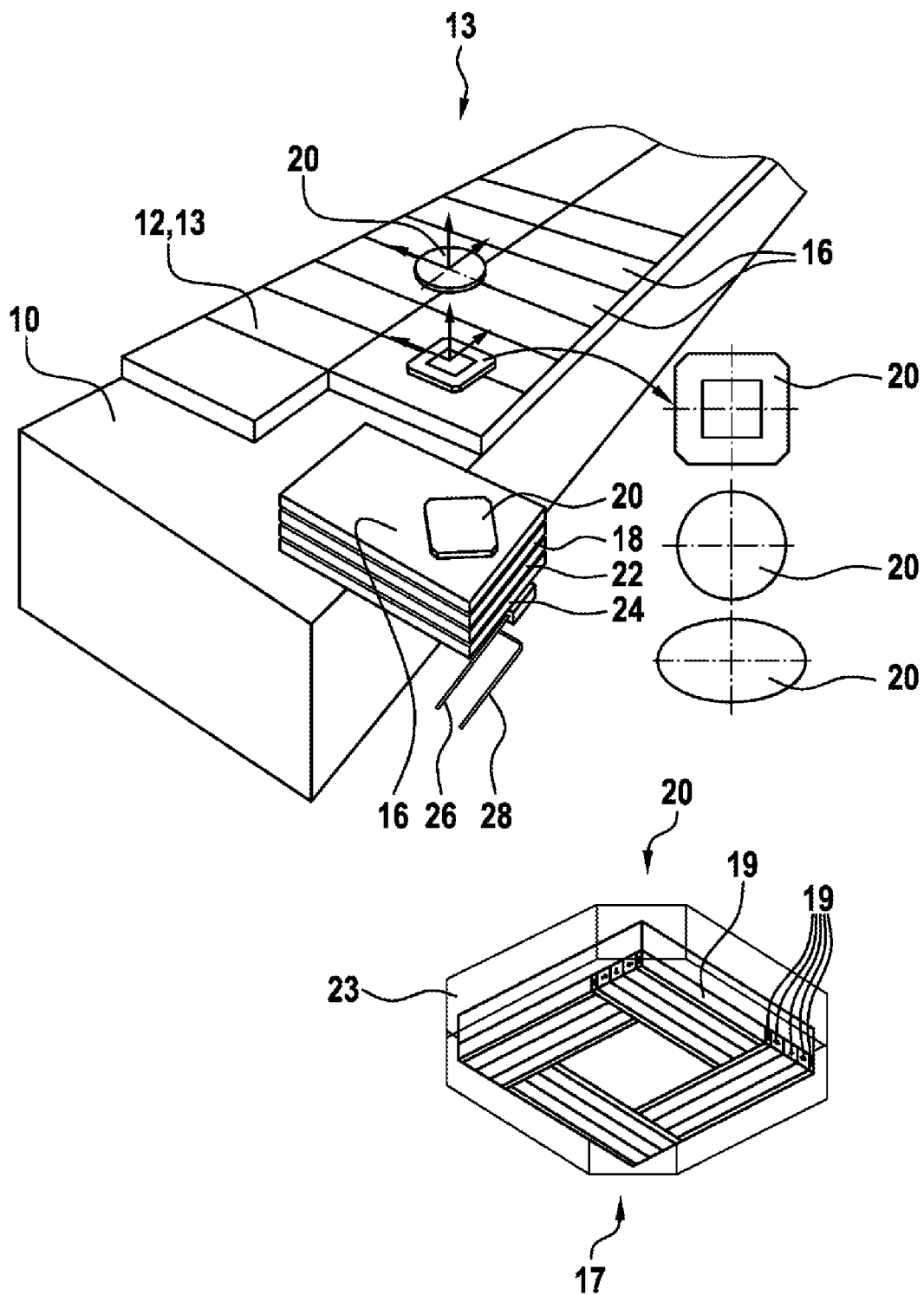
FIG. 2 shows a representation of the system of the apparatus.

In the case of the exemplary embodiment according to FIG. 2, two movers 20 with different basic forms are shown as an example, namely a substantially rectangular mover 20 and a round mover 20. An oval shape would also be conceivable. The carrier plate 12 or drive surface 13 consists of several individual parts or tiles 16. The tiles 16 are realized in a square or rectangular manner. The tiles 16 have a substantially planar surface and are constructed in layers. The tile 16 is realized in a square or rectangular manner. Thus, the tile 16 includes a coil plane 18, a sensor plane 22 and a power electronic plane 24. A bus system 26, which connects the tiles 16 to a central computer or processor (not shown), is additionally provided. A power supply 28 with associated connections by means of which the power electronic plane 24 or the coil plane 18 and/or the sensor plane 22 can be supplied with power is additionally provided.

The basic platform 10 describes the base element. The necessary design possibilities of the system in space are produced from said base element. The basic platform 10 is to be understood as the system carrier or a machine frame. It must comprise the necessary rigidity. The basic platform 10 can already receive control components and power electronics. As an option, the carrier plate 12 or drive surface 13 could also already be a component part of the basic platform 10. The basic platform 10 provides the base or the element for the arrangement of further functioning units. The basic platform 10 is additionally the base or the element for the arrangement of further transport systems. The basic platform 10 is to be compatible with other basic platforms. The movers 20 are arranged on the surface of the basic platform 10 on the drive surface 13 so as to be movable relative thereto. To this end, the drive surface 13 or the carrier plate 12 produces a drive force which acts on the mover 20 and displaces it into the desired movement. The stationary drive surface 13 is preferably realized in a planar manner. The mover 20 is actuated such that it is slidable in at least two degrees of freedom and/or is rotatable. Consequently, in particular as described below, different stations are able to be approached in a flexible manner if they are connected together suitably by the drive surface 13.

The mover 20 describes the movable element of the apparatus 8. On the one hand, the mover 20 serves for producing a relative movement in relation to the carrier plate 12 or drive surface 13. In addition, there is interaction between the movers 20 or between the mover components. In addition, the mover 20 generates a force onto the carrier plate 12 or drive surface 13. To this end, the mover 20 includes at least one means for generating a magnetic field, in particular a magnet, preferably a permanent magnet 19, which interacts with coils 18 of the carrier plate 12 or of the drive surface 13 which produce a moving field for the generation of movement. In this connection, an air gap is realized between the carrier plate 12 or the drive surface 13 and the mover 20 such that a contactless movement of the mover 20 relative to the drive surface 13 is able to take place. In addition, the mover 20 can comprise means for detecting a position.

In one view of FIG. 2, the mover 20 is shown in perspective. A bottom surface 17 of the mover 20 interacts with the carrier plate 12 or drive surface 13. Several permanent magnets 19 are arranged on the bottom surface 17 of the mover 20. The magnetic fields of adjacently arranged permanent magnets 19 differ from one another. The bottom surface 17 essentially consists of four fields each with several permanent magnets 19. The central region of the bottom surface 17 does not comprise any permanent magnets 19. WO 2013/059934 A1 provides even more alternative developments which are included in the disclosure of the present application. The mover 20 is surrounded by an anti-collision means 23, which is advantageous where there is a plurality of moved movers 20.

The carrier plate 12 or drive surface 13 provides a multi-layered component according to FIG. 2. It comprises the following basic functionalities. On the one hand, it includes means for generating a relative movement in relation to the mover 20. In addition, a force which acts on the mover 20 is generated. In addition, it includes means for generating distances (air gap) between the carrier plate 12 and the mover 20. In addition, the carrier plate 12 includes means for detecting positions as well as means for detecting power transmission and means for transmitting data.

Figure 3:
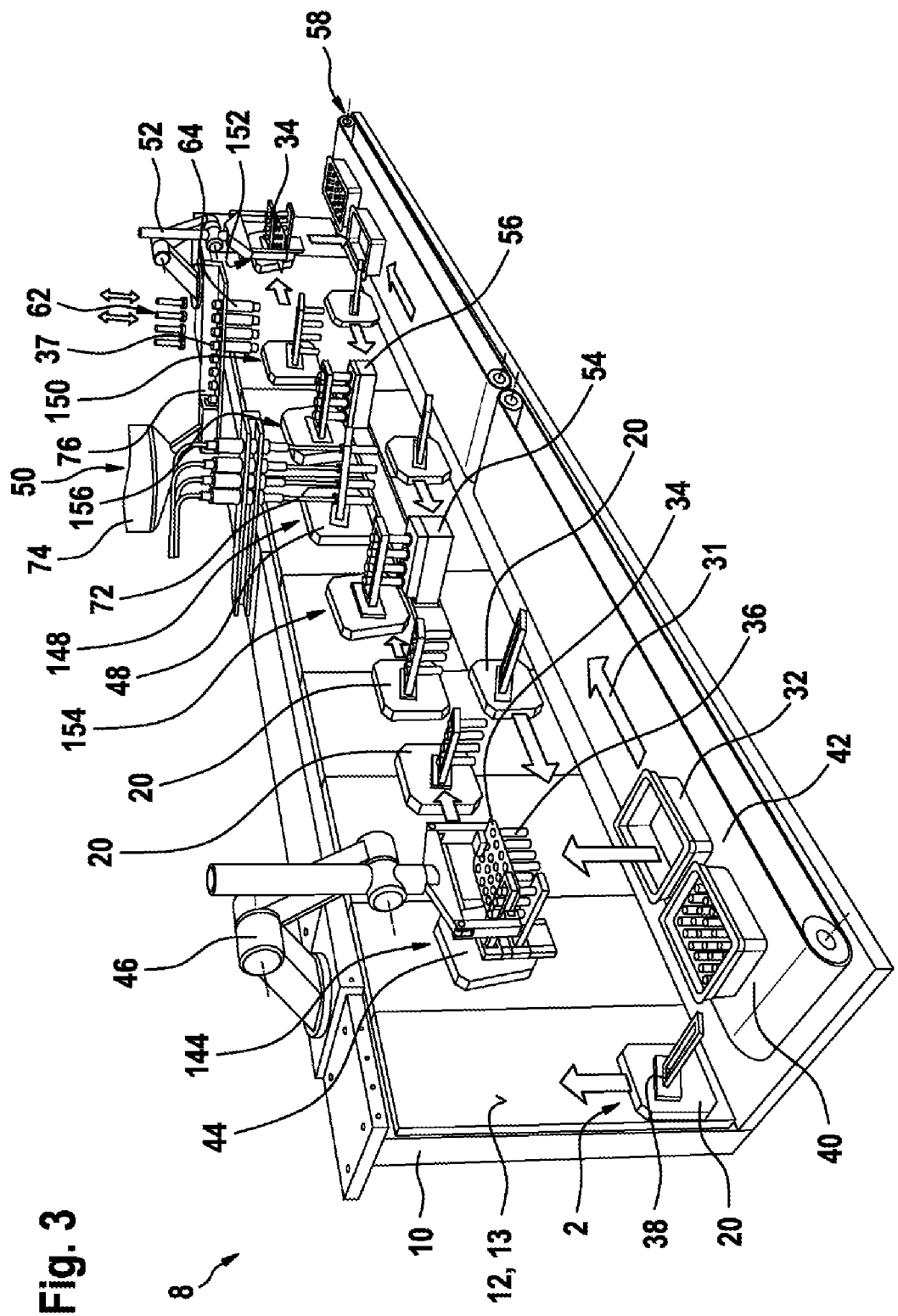
FIG. 3 shows a perspective representation of a machine design for filling pharmaceutical containers that are connected in nests.

According to FIG. 3, the mover 20 comprises at least one container receiving means 38 for receiving at least one of the containers 36 to be transported. The container receiving means 38 is preferably realized in a slot-shaped manner in such a way that several containers 36 are able to be arranged one next to another and held by the receiving means 38. However, a different development of the container receiving means 38 is also possible. In addition, the mover 20 could include means for moving the containers 36. The mover 20 is preferably cast in order to protect the magnets located inside from environmental influences such as, for example, from corrosion. A process mover 21 is constructed in a technically identical or similar manner as the mover 20, but, instead of the containers 36, moves components of process stations, as explained in more detail below. The drive principle or the interaction with the described drive surfaces 13, however, is not different.

The apparatus 8 for processing in particular containers 36 that are connected in nests can be explained in more detail by way of FIG. 3. Containers 36 that are situated in a nest 34 are delivered in a tub 32, a trough-shaped container as shown. The nest 34 serves for receiving containers 36 in particular in the tub 32. A tub inlet 40 forms the interface to a machine connected upstream (not shown). The tubs 32 are moved by means of a transport device 42 in a direction of transport 31 indicated by an arrow. Various usual transport solutions (band, belt) can be utilized, a solution with transport belts as transport device 42 being shown. In principle, transporting the tubs 32 in a horizontal plane by means of a planar drive corresponding to the representation according to FIG. 1 would also be possible, that is to say using the mover 20 which is arranged on the horizontally aligned carrier plate 12 or drive surface 13 and is realized for transporting the tub 32.

According to FIG. 3, the carrier plate 12 or drive surface 13 is realized as a vertical plane for the movement of the mover 20. The mover 20 is moved from a starting position 120 shown at the front on the left up into a singling-out position 144. In the singling-out position 144, the mover 20 is situated within the reach of a removal means 46. The removal means 46 is realized, for example, as a robot or robot arm. It serves for removing a nest 34 provided with containers 36 out of the tub 32. The removal means 46 is capable, as a result of an up and down movement, of removing at least one row of containers arranged perpendicular with respect to the direction of transport 31 and/or of depositing them in the container receiving means 38 of the mover 20. Consequently, the containers 36 located in the nest 34 are removed and consequently put into singles in rows. Put into singles in rows is to be understood as several containers 36 being arranged substantially in one row perpendicular to the direction of transport 31.

Where applicable, the mover 20 can carry out the removal of the containers 36 out of the tub 32, which is provided by the removal means 46, by the mover 20 itself generating a corresponding removal movement relative to the removal means 46. To this end, the mover 20 moves the container receiving means 38 over the openings of the containers 36 which are standing by for removal. The width of the preferably slot-shaped recess of the container receiving means 38 is greater than the diameter of the neck of the container 36. The mover 20 moves the container receiving means 38 in such a manner that the recess is able to close around the containers 36. The containers 36, which are surrounded by the container receiving means 38, are then held by the mover 20 rotating the container receiving means 38 such that the containers 36 are clamped as a result. As a result, the inside edges of the preferably slot-shaped recess contact the side walls of the container 36 on both sides. Once the container receiving means 38 has been rotated or has made positive locking contact with the containers 36, the mover 20 moves upward and removes the containers 36 which have now been put into singles in rows. As an alternative to this, the nest 34 could also be lowered.

The removed rows of containers are transported by the mover 20 from the singling-out position 144 to a weighing device 54 and into a weighing position 154. In this connection, the mover 20, and consequently also the container receiving means 38, maintains the slightly tilted position as indicated in FIG. 3 so that the containers 36 continue to be clamped and held. Said weighing device 54 weighs the empty containers 36, serving therefore for tare weighing. To this end, the mover 20, as a result of a corresponding movement up and down in the vertical direction, could release the containers 36 to be weighed on the weighing device 54. The releasing is effected as a result of tilting the mover 20 and consequently the container receiving means 38 in the opposite direction such that the containers 36 are no longer held in a clamping manner. The particular advantage of putting into singles in rows is shown precisely in the case of weighing. Usual weighing devices 54, 56, which are usually designed for at least single-row weighing, can consequently be used. This is possible in the case of the in-nest processing that is usual up to now, however at great expense such that in the majority of cases only a small percentage is weighed. The weighing could be effected in rows, but also individually.

Once weighing has been carried out in the (first) weighing position 154, the mover 20 transports the weighed empty containers 36 into a filling position 148 where a filling station 48 is arranged. To this end, the mover 20 tilts the container receiving means 38 such that the previously released containers 36 are once again held in a clamping manner.

The filling station 48 comprises filling needles 72. The filling needles 72 are arranged in a preferred manner in a row, in a particularly preferred manner in a row perpendicular to the direction of transport 31. The liquid to be filled can be, for example, pharmaceutical products. In the filling position 148, the filling needles 72 are moved toward one another relative to the containers 36. This could be achieved as a result of the filling needles 72 themselves being movably realized and/or the containers 36 being moved or raised by the mover 20. In the variant shown in FIG. 3, the relative movement is effected purely by means of the mover 20 moving the containers 36. The mover 20, on the one hand, maintains the rotation for holding the containers 20 in a clamping manner. On the other hand, the mover 20 moves the containers 36 along the axis of the filling needles 49 during the filling operation. Said relative movement can be modified during the filling operation. As the fill level increases in the container 36, the mover 20 lowers the container 36 down. Disruptive bubble formation during the filling process is reduced as a result. Once filling has been effected, the filling needles 72 are moved away from one another relative to the containers 36. This could be effected as a result of the filling needles 72 themselves being movably realized and/or the containers 36 being moved or lowered by the mover 20. In the exemplary embodiment, the mover 20 lowers the containers 36 further down parallel to the axis of the filling needles 72 such that a collision-free lateral movement is possible.

Once filling has been effected, the mover 20 transports the filled containers 36 into a further weighing position 156 within the coverage range of a (further) weighing device 56. The transport can be effected then such that the filled containers 36 are prevented from sloshing as a result of suitably pivoting the containers 36 about a horizontal axis. To this end, further tilting is effected according to a specific movement profile, the containers 36 continuing to be held in a clamping manner. The anti-sloshing function is explained in more detail further below in conjunction with FIG. 7.

Gross weighing is carried out at the weighing device 56. In this connection, similarly as in the tare weighing position 154, the filled containers 36 are deposited on and received by the weighing device 56 or alternative fill level detection devices. In the weighing position 156, the following functions have to be realized: holding the containers 36 as a result of correspondingly clamping, releasing the containers 36 as a result of correspondingly rotating the container receiving means 38 in the opposite direction such that the containers 36 are no longer held in a clamping manner for weighing, as well as subsequently holding the containers 36 in a clamping manner as a result of rotating the mover 20.

If the result of the gross weighing in the weighing position 156 should be that a non-tolerable quantity has been filled, the mover 20 could lock out the corresponding container 36 and/or possibly move it into the filling position 148 for topping up.

The weighed containers 36 are moved by the mover 20 into a closing position 150 which is situated within the coverage range of a closing station 50. The closing station 50 includes at least one setting tube 64 and one plunger 62. Setting tubes 64 and plungers 62 are arranged in rows, in particular in a row perpendicular to the direction of transport 31. In addition, closures 37 such as, for example, stoppers, are supplied to the setting tubes 64 by means of a feeder 76 in order to close the filled container 36. The closure 37 passes into the interior of the setting tube 64. The setting tube 64 is realized such that the closure 37 is somewhat compressed circumferentially such that it subsequently expands again in the container opening and thus closes said opening. The closure 37 is moved into a suitable position above the container opening. A relative movement is then effected between the container 36 and the closure 37 by the plunger 62 plunging into the setting tube 64 and pressing the closure 37 into the container opening. As an alternative to this or in addition to it, the container 36 itself could also be moved by the mover 20 toward the closure 37. The container 36 is closed.

The closed containers 36 are then moved into a resetting position 152 to be reset into the nest 34. The mover 20 moves the closed containers 36 into the coverage range of a handling device 52 for this purpose. Said handling device 52 can be a robot, for example. The handling device 52 removes, for example, the empty nest 34 which is transported by a tub 32. The mover 20 sets the singled-out rows of containers back into the nest 34. To this end, the containers 36, which are held in a clamping manner, are moved into the nest 34 in the resetting position. As a result of rotating the mover 20 or the container receiving means 38 in the opposite direction preferably in the horizontal, the clamping is eliminated again. The mover 20 then moves the container receiving means 38 without the containers 36.

Once all the rows of the nest 34 have been charged with containers 36, the handling device 52, as a result of raising and lowering, resets the nest 34 filled with containers 36 back into the empty tub 34. Said resetting functionality can be realized by means of the mover 20 and the handling device 52, for example a robot or an external axis portal or the like.

The mover 20 is then moved from the resetting position 152 back again into the starting position 140 again. This could be effected, for example, with a mover 20 which is developed as an active planar drive. As an alternative to this, a planar drive with a static traveling field and/or an additional guide would be possible or, however, also a passive conveying means (such as for example a chain, belt etc.).

The filled tub 32 stands by at an outlet 58 which serves as an interface to a machine connected downstream.

The following optional process steps can be incorporated into the processing. This can be effected in an application-specific and modular manner: closing under an inert atmosphere, setting the vacuum stopper, preliminary gas application, double chamber, spray/cartridge, flanging, inserting mixing balls for example suspension, inspection (front closure, container, needle, stopper seat, residual oxygen, fill level, residual air bubble), removal station, identification, product loss avoidance.

Figure 4:
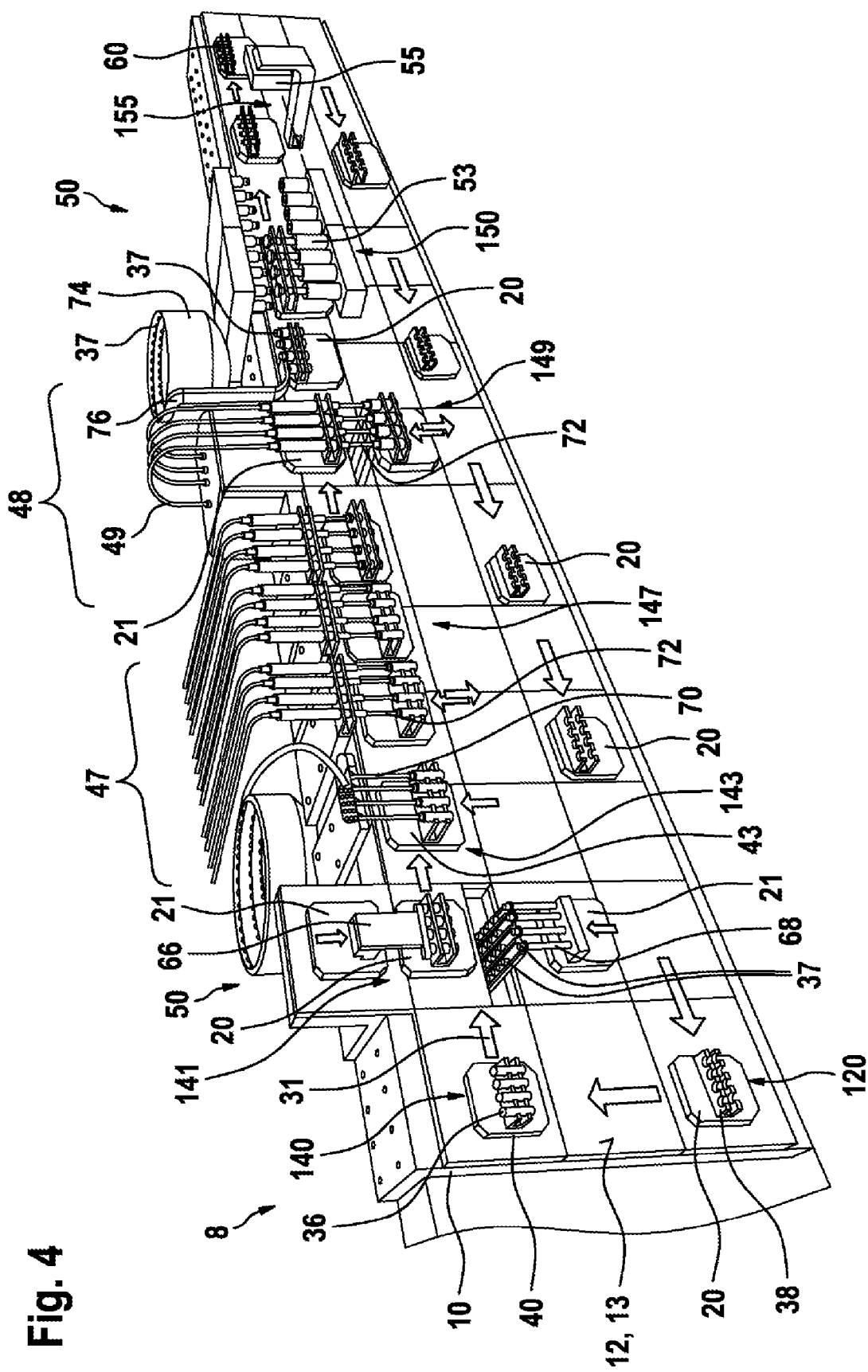
FIGS. 4 and 5 show perspective representations of further machine designs for filling in particular pharmaceutical containers.

An apparatus 8 for processing containers 36, in particular cartridges, can be explained in more detail by way of FIG. 4. Containers 36 to be filled are delivered in a manner not shown in detail. These can be in particular containers 36 that are to be filled with liquid pharmaceutical products such as, for example, injections, ampoules, cartridges, vials or the like.

An inlet 40 forms the interface to a machine connected upstream and not shown. The container receiving means 38 according to FIG. 4 consists of two strips, which are provided with coaxial, part-circular recesses and extend along the surface of the mover 20. As an example, four containers 36 can be received. However, another suitable number would also be possible.

According to FIG. 4, the carrier plate 12 or drive surface 13 is realized as a vertical plane for the movement of the mover 20. The mover 20 is moved upward from a starting position 120 shown on the left-hand side at the front into an inlet position 140. In the inlet position 140, the mover 20 is situated within the reach of the supplied containers 36. In the inlet position 140, the supplied containers 36 are moved into the container receiving means 38 by means of handling devices or the like (not shown in any detail).

The received containers 36 are transported by the mover 20 from the inlet position 140 to a closing station 50, in particular for inserting piston stoppers as the usual closures 37 for said purpose, as is typical for cartridges, glass tubes that are open at the top and at the bottom, in an insertion position 141. In this connection, the containers 36 are closed from below by closures 37 (stoppers). The closing station 50 includes at least one hold-down device 66 and one plunger 68. Several hold-down devices 66 and plungers 68 are arranged one behind another parallel to the direction of transport 31 or to the drive surface 13 corresponding to the receiving means geometry of the container receiving means 38. In this connection, different variants as to how a relative movement is produced between stoppers or closures 37 and containers 36 are possible. Thus, the hold-down device 66 and/or the plunger 68 could be moved by a servo drive or also by means of a mover 20 or a process mover 21. FIG. 4 shows a variant where the hold-down device 66 and plunger 68 are moved in each case by process movers 21. Such movers 20 which move certain process steps (closing, for example piston setting, filling, etc.) with the associated components, but not directly the containers 36 are to be understood as process movers 21. When the closures 37 are set, the upper process mover 21 moves the hold-down device 66 to the top surface of the containers 36 which are held ready by the mover 20. The lower process mover 21 moves the closures 37 received by the plunger 68 upward and presses them into the bottom surface of the containers 36.

Once the containers 36 have been closed at the bottom by the closures 37 (stoppers) in the insertion position 141, the mover 20 moves the containers 36 into a ball insertion position 143. In this connection, the containers 36 are situated below feeders 70 of a ball insertion station 43 by means of which one or more balls are moved into the interior of the container 36 as is necessary for certain dosage forms of specific pharmaceuticals.

Once the ball has been inserted, the mover 20 moves the containers 36 into a preliminary filling position 147. Several filling needles 72 of a preliminary filling station 47 can be provided here, below which the mover 20 moves the containers 36 which are to be preliminarily filled. The filling needles 72 are arranged in rows parallel to the direction of movement 31 for this purpose. Several preliminary filling points can be provided, three preliminary filling points each with four filling needles 72 are provided as an example in FIG. 4. The mover 20 can be actuated such that it approaches a free preliminary filling point. To this end, a corresponding sensor system, which detects the presence of a mover 20 at a preliminary filling point and by means of a higher-ranking control unit activates the respective drive surfaces 13 such that the mover 20 does not actuate an occupied preliminary filling point, is provided for evaluating the current mover positions.

The filling needles 72 could either be arranged rigidly as shown in FIG. 4 or movably. In any event, a relative movement is effected in a preferred manner between the filling needle 72 and the container 36. The filling is effected in a preferred manner above or below the fill level, depending on the product type, in order to support foam-free filling. The filling needle 72 and/or the container 36 are moved for this purpose. The filling needles 72 could be moved by a servo drive or a mover 20 or process mover 21. In the case of the exemplary embodiment according to FIG. 4, however, the containers 36 are moved relative to the filling needles 72 by means of the mover 20. During the filling process, the mover 20 moves the containers 36 down away from the filling needles 72 parallel to the axis of the filling needles 72. An advantage of a rigid filling needle 72 is to be seen in reduced particle emissions in said particle-sensitive process area on account of a movement-free filling operation, as could otherwise occur, for example as a result of friction in the movement of the feeders or the like. In the case of said variant, the filling needles 72 can also be, for example, fixed pipes. The mover 20 could also tilt the containers 36 at a slight angle during the filling operation as a result of slight tilting to support a foam-free filling. The containers 36 could be lowered at a slight angle parallel to the axis of the filling needles 72 during the filling operation.

Once the preliminary filling has been effected, the mover 20 moves the preliminarily filled containers 36 from the preliminary filling position 147 into a residual filling position 149. There a residual filling station 49 includes several filling needles 72 arranged in rows parallel to the direction of transport 31 and a corresponding sensor system by means of which the precise residual filling is able to be controlled and monitored. As already stated in conjunction with the preliminary filling station 47, a relative movement is to be possible between the containers 36 and the filling needles 72 during the filling process. In the case of the exemplary embodiment according to FIG. 4, the filling needles 72 of the residual filling station 49 are movably arranged here on a process mover 21. By means of the movement of the process mover 21, once again a filling can be achieved above or below the fill level by the filling needles 72 pulling back up out of said containers parallel to the axis of the containers 36 during the filling operation. As an alternative it would be conceivable to place the filling needles 72 and/or the containers 36 at a slight angle during the filling process to optimize the filling operation. As an alternative, it would also be conceivable to move the containers 36 also during the filling operation in addition to the filling needles 72.

Once the residual filling has been effected, the mover 20 moves the correctly filled containers 36 from the residual filling position 149 into a position 151 in which a closure 37 or a cap is supplied to the container 36. A closing station 50 includes a container 74, in which the closures 37 are stored and are made ready in a suitable manner in singles by means of a feeder 76. In this connection, the mover 20 moves the container 36 by way of a preferably continuous towing movement along the feed 76 such that the closure 37 comes to rest on the container opening.

The mover 20 then moves the container 36 provided with a closure 37 into a closing position 150. There the closure 37 and the container 36 are situated within the coverage range of a closing station 50. This can be a flanging station 53 for example. The corresponding flanging rollers are not shown. The mover 20 positions the containers 36 within the coverage range of the flanging station 53 which carries out a positive locking connection between the closure 37, such as for example an aluminum cap, and the container 36. The containers 36 are then closed in the desired manner.

The mover 20 can then move the closed containers 36 into an inspection position 155 which is possible as an option and is situated within the coverage range of an inspection station 55. This latter could be provided with corresponding sensor systems in order to detect and evaluate the desired inspection criteria automatically.

The closed containers 36 are then moved into an outlet position 160 within the coverage range of an outlet 60 which supplies the containers 36, where applicable, to further processing steps. The transfer can be realized by means of the mover 20 and/or a handling device 52, for example a robot or external axis portal or the like.

The empty mover 20 is then moved from the outlet position 160 back again into the starting position 140. This could be effected, for example, with a mover 20 that is developed as an active planar drive. As an alternative to this, a planar drive with a static traveling field and/or an additional guide would be possible or also a passive conveying means (such as for example a chain, belt, etc.).

Figure 5:
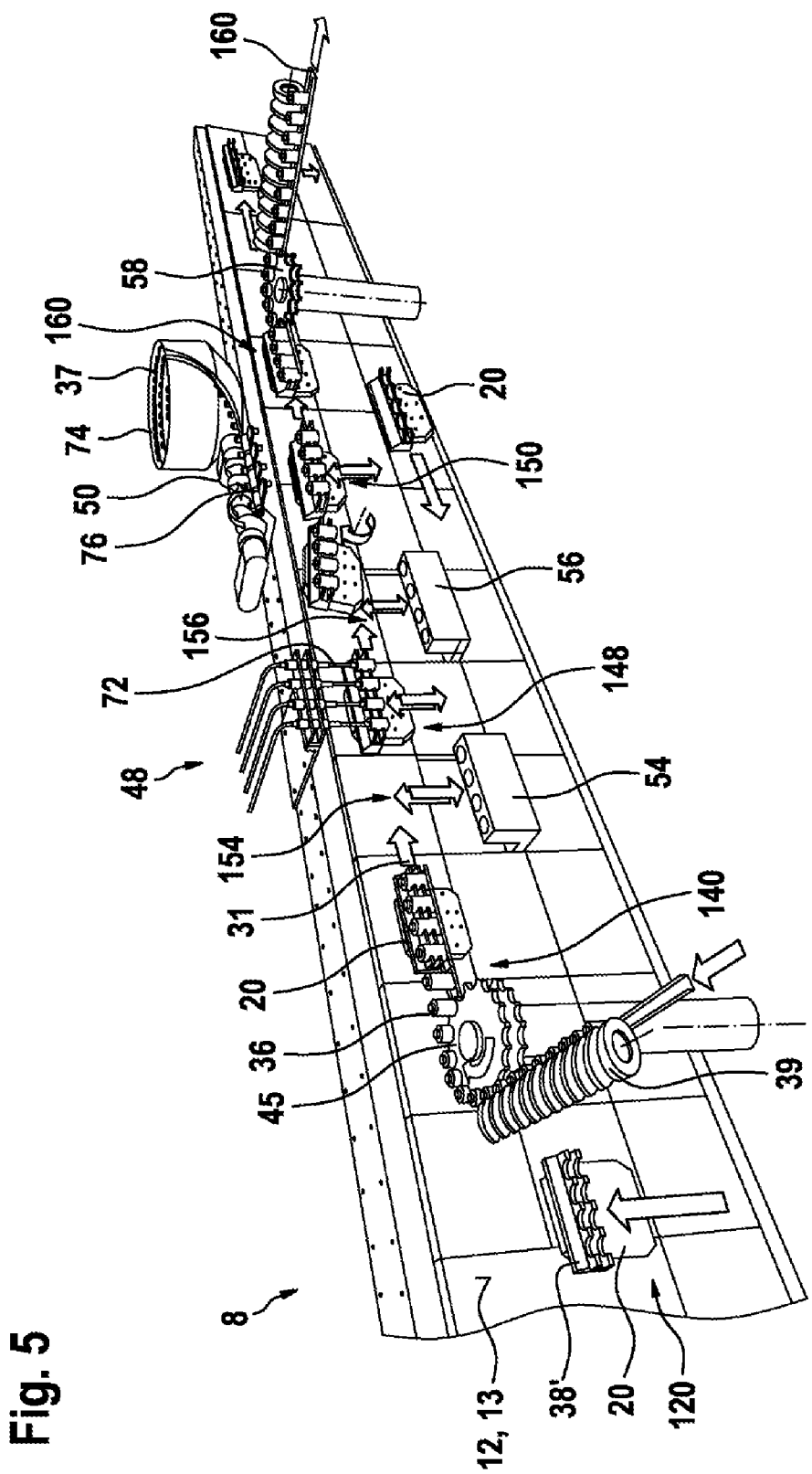

FIG. 5 shows an apparatus 8 for processing containers 36, in particular ampoules or vials. The containers 36 to be filled are supplied by means of a conveying screw 39 perpendicular to the plane of the carrier plate 12 or drive surface 13. A guide wheel 45 takes over the guiding of the containers 36 about 90° parallel to the surface of the carrier plate 12 into an inlet position 140. There the mover 20 takes the containers 36 out of the inlet 40 into the container receiving means 38. Suitable handling devices which accomplish said transfer can be provided for this purpose. At least two movers 20, which, directly adjoining one another, are moved between the guide wheel 45 and the carrier plate 12 or driving surface 13, can be provided as an example. The movers 20 are moved at the same speed as the incoming containers 36 on the guide wheel 45. A third mover 20 already stands by when all the container receiving means 38 of the first mover 20 are filled and said first mover leaves the coverage range of the guide wheel 45. In the meantime, the second mover 20 is filled at a speed synchronized with containers 36 supplied by the guide wheel 45 and so on.

The various steps of the receiving of the containers supplied by means of the guide wheel 45 are shown in FIG. 6. The guide wheel 45 is rotated about an axis parallel to the plane of the carrier plate 12 or drive surface 13 as is also shown in FIG. 5. In the position nearest the drive surface 13, the outer container receiving means of the guide wheel 45 are also arranged at a spacing to the drive surface 13. Said spacing is chosen such that the container receiving means 38 of the mover 20 can be arranged between the drive surface 13 and the nearest outer container receiving means of the guide wheel 45 such that the container 36 to be transferred passes between both receiving means.

In a first step (FIG. 6*a*) first mover 20.1 and second mover 20.2 are situated in the vicinity of the guide wheel 45, but are not yet engaged. In the second step (FIG. 6*b*), the first mover 20.1 moves the container receiving means 38 to a level with the guide wheel 45. The first mover 20.1 aligns the container receiving means 38 parallel to the plane of the guide wheel 45, for example horizontally as shown in FIGS. 5 and 6. The second mover 20.2 approaches closer to the guide wheel 45. In a third step (FIG. 6*c*) the first mover 20.1 is moved at the same speed as the rotational speed of the container receiving means of the guide wheel 45. The first mover 20.1 is synchronized. The container receiving means of the guide wheel 45 and of the first mover 20.1 also face one another such that the container 36 located in between is able to be transferred securely from the guide wheel 45 to the first mover 20.1. The second mover 20.2 approaches closer just as a third mover 20.3. In a fourth step (FIG. 6*d*) the second mover 20.2 is aligned in a suitable manner. The first mover 20.1 continues to move synchronously with the guide wheel 45 for receiving the containers 36. The third mover 20.3 is moved further toward the guide wheel 45. In a fifth step (FIG. 6*e*) the second mover 20.2 is synchronized and is moved at the same speed as the receiving means of the guide wheel 45. The container receiving means 38 connects directly to that of the first mover 20.1. The first mover 20.1 continues to move at a constant speed and receives the containers 36 supplied by the guide wheel 45. In a sixth step (FIG. 6*f*) first and second movers 20.1, 20.2 continue to move at the same speed within the coverage range of the guide wheel 45. The third mover 20.3 approaches closer. In a seventh step (FIG. 6*g*) the third mover 20.3 moves its container receiving means 38 to the same level with that of the guide wheel 45. First and second movers 20.1, 20.2 continue to move. The first mover 20.1 begins to leave the range of the guide wheel 45. In the eighth step (FIG. 6*h*) the first mover 20.1 is no longer engaged with the guide wheel 45 and moves the container receiving means 38, now completely provided with containers 36, to the next processing station. Second and third movers 20.2, 20.3 continue to move at the same speed as the guide wheel 45. A fourth mover 20.4 is moved into the vicinity of the guide wheel 45. In a ninth step (FIG. 6*i*) the container receiving means 38 of the fourth mover 20.4 is moved to the same level as the receiving means of the guide wheel 45. Second and third movers 20.2, 20.3 are moved directly one behind another at the same speed as the circumferential speed of the receiving means of the guide wheel 45. Then the steps from FIG. 6*g* are repeated.

According to FIG. 5, the carrier plate 12 or drive surface 13 is realized as a vertical plane for the movement of the mover 20. The mover 20 is moved upward from a starting position 120 shown on the left at the front into the receiving position 140. Corresponding holding, gripping and positioning functions are to be carried out in the receiving position 140. The removed row of containers is transported by the mover 20 from the receiving position 140 to a weighing device 54 into a weighing position 154. The weighing device 54 includes several load cells (not described in detail) which are arranged in a row parallel to the direction of transport 31. The weighing device 54 can be moved up and down as indicated by the arrows in order to contact the containers 36 to be weighed. Said weighing device 54 weighs the empty containers 36 and therefore serves for tare weighing. To this end, the mover 20 can release the containers 36 to be weighed on the weighing device 54 as a result of a corresponding up and down movement in the vertical direction. This could be effected in rows or, however, also individually. The following functions of the mover 20 or of the container carrier 38 are to be realized in the weighing position 154: depositing and receiving the containers 36 on the weighing device 54.

Once the weighing has been effected in the (first) weighing position 154, the mover 20 transports the weighed empty containers 36 into a filling position 148 where a filling station 48 is arranged. The filling station 48 comprises filling needles 72 which are preferably arranged in a row which is oriented parallel to the direction of transport 31. The liquid to be filled can be, for example, pharmaceutical products. In the filling position 148, the filling needles 72 are moved relative to the containers 36. This could be achieved as a result of the filling needles 72 themselves being movably realized and/or the containers 36 being moved or raised by the mover 20. In an alternative that is not shown, in a similar manner to the case of the exemplary embodiment according to FIG. 4, the filling needles 72 could be moved by a process mover 21 during the filling operation. Said relative movement can be modified during the filling operation as has already been described in detail in conjunction with the exemplary embodiments according to FIGS. 3 and 4. Once the filling has been effected, the filling needles 72 are moved away from one another relative to the containers 36. This could be effected as a result of the filling needles 72 themselves being movably realized and/or the containers 36 being moved or lowered by the mover 20.

Once the filling has been effected, the mover 20 transports the filled containers 36 into a further weighing position 156 within the coverage range of a further weighing device 56. The transport can now be effected such that the filled containers 36 are prevented from sloshing as a result of suitably pivoting the containers 36 about a horizontal axis as indicated by a corresponding arrow.

The gross weighing is effected on the weighing device 56. In this connection, similarly as in the tare weighing position 154, the filled containers 36 are deposited on and received by the weighing device 56 or alternative fill level detection devices. Once again, the further weighing device 54 is also movably realized for receiving the containers 36 to be weighed. In the weighing position 156, the following functions of the mover 20 or container receiving means 38 have to be realized: depositing and receiving the containers 36 on the weighing device 56.

If the result of the gross weighing in the weighing position 156 should be that a non-tolerable quantity has been filled, the mover 20 could lock out the incorrectly filled container 36 or possibly move it into the filling position 148 for topping up.

The weighed containers 36 are moved by the mover 20 into a closing position 150 which is situated within the coverage range of a closing station 50. The closing station 50 is realized as an example as a stopper setting station. It includes at least one container 74 for the closures 37 which provides a feeder 76 in a suitable manner. A relative movement is then effected between the container 36 and the closure 37. To this end, the mover 20 moves the open containers 36 upward such that the closures 37 are able to be inserted into the container openings.

The closed containers 36 are then moved into an outlet position 160 to be transferred into an outlet 60. A guide wheel 58, which receives the supplied containers 36 and, after a 90° rotation, transfers them into the outlet 60 in the form of a conveying screw, is provided for this purpose. In this connection the mover 20 is synchronized to the speed of the guide wheel 58 such that in the transfer position it is moved at the same speed as the circumferential speed of the conveying wheel 58.

The mover 20 is then moved from the outlet position 160 back again into the starting position 120 again. This could be effected, for example, by way of a mover 20 which is developed as an active planar drive. As an alternative to this, a planar drive with a static traveling field and an additional guide would be possible or, however, also a passive conveying means (such as for example a chain, belt etc.).

The filled container 36 stands by in the outlet 60 which serves as an interface to a machine that is possibly connected downstream.

The following optional process steps can be incorporated into the processing. This can be effected in an application-specific and modular manner: gas application, beading, inacceptable/acceptable outlet, inspection, removal station, screw station, marking, storing, product loss avoidance.

According to FIG. 7, the mover 20 is provided with a container receiving means 38 in which are situated containers 36 filled with a shadowed product 35. The fill level of the product 35 is horizontally oriented in a first state a. In said first state a, a' the product 35 is at rest (acceleration and speed equal to zero). The mover 20 which interacts with a drive surface 13 (not shown) can be rotated about a pivot point 33.

In the top row of FIG. 7, a mover 20 is shown without actuation for preventing sloshing of the products 35, in the row below this a mover 20 is shown with actuation for preventing sloshing of the product 35 in the corresponding states. In a second state b, b', the mover 20 accelerates the product at a constant positive acceleration a. The speed v increases linearly in a corresponding manner. The product 35 at the top (state b) sloshes, the fill level of the product 35 is inclined with respect to the horizontal or is no longer oriented perpendicular with respect to the container axis. In the case of the actuation of the mover shown below (state b') for preventing the sloshing however, the mover 20 rotates the container receiving means 38 about the pivot point 31 by an angle $\alpha$. The angle $\alpha$ is dependent on the respective acceleration a (tan $\alpha$=a/g, where a is the acceleration of the mover 20 and g is gravity). The angle $\alpha$ describes the rotation in relation to the normal position or rest position. According to state b' sloshing is prevented as a result of rotating the mover 20. The fill level of the product 35 remains aligned perpendicular to the container axis.

Once it has run through the acceleration phase (states b, b'), a phase at constant speed follows (states c, c'). In said phase the mover 20 is no longer rotated by an angle $\alpha$ ($\alpha$=0).

In a subsequent phase (states d, d') the mover 20 is delayed at a constant negative acceleration. Without anti-sloshing actuation (state d) the fill level is no longer aligned perpendicular to the container axis. With anti-sloshing actuation (state d') in contrast, the mover 20 rotates the container carrier 38 as shown by an angle $\alpha$ (tan $\alpha$=a/g, where a is the (negative) acceleration of the mover 20 and g is gravity). As a result, the fill level remains oriented perpendicular to the container axis and sloshing is consequently prevented.

The use of movers 20, 21 which interact in the form of a planar drive with the carrier plate 12 or drive surface 13, open up flexible possibilities both for the container transport and for the movement of components of process stations. The described process stations 38, 40, 43, 44, 47, 48, 49, 50, 51, 53, 54, 55, 56 or those provided depending on the application can also be assembled in another manner in an apparatus 8; on account of the flexible transport system installations can also be constructed and, where applicable, modified in a very flexible and modular manner. On account of the substantially contactless drive system, said drive system is precisely suited for application in filling and/or closing and/or weighing devices in the pharmaceutical industry as the demands with respect to particle cleanliness are particularly high here. Other areas of application are also possible, however, in principle.

The invention claimed is:

1. An apparatus for transporting a container relative to a filling station, including at least one filling station (48) for filing at least one container (36), at least one container receiving means (38) for transporting the container (36) relative to the filling station (48), at least one drive surface (13) extending along a vertical plane and at least one mover (20) which is couplable to the drive surface (13), wherein the mover (20) is on the drive surface (13) so as to be displaceable in at least two degrees of freedom and/or rotatable, and wherein the container receiving means (38) is connected to the mover (20).

2. The apparatus as claimed in claim 1, characterized in that the mover (20) moves a filled container (36) with a certain movement profile in order to reduce sloshing of a product (35) filled in the container (36).

3. The apparatus as claimed in claim 1, characterized in that the mover (20) is rotated about a pivot point (33) by an angle ($\alpha$) in relation to a rest position.

4. The apparatus as claimed in claim 1, characterized in that at least one inlet is provided for supplying the containers (36), wherein the mover (20) moves the container receiving means (38) for taking over the supplied containers (36) at the same speed as the inlet (39, 40, 45) supplies the containers (36).

5. The apparatus as claimed in claim 4, characterized in that the inlet (45) is arranged relative to the drive surface (13) such that the inlet (45) is in contact for supplying on one side of a container (36), while on another side of the container (36) the container receiving means (38) of the mover (20) can move into contact with the container (36) for taking over the container (36) supplied from the inlet.

6. The apparatus as claimed in claim 1, characterized in that several movers (20, 20.1, 20.2, 20.3) are arranged next to one another for taking over the container (36) supplied from the inlet.

7. The apparatus as claimed in claim 1, characterized in that several movers (20, 20.1, 20.2, 20.3) are arranged next to one another and are moved at the same speed for taking over the container (36) supplied from the inlet.

8. The apparatus as claimed in claim 1, characterized in that the mover (20) is rotated about a pivot point (33) by an angle (α), wherein the angle (α) is determined by a relationship tan α=a/g, wherein a is the acceleration of the mover (20) and g is gravity.

9. The apparatus as claimed in claim 1, characterized in that the container receiving means (38) can receive several containers (36) and/or the container receiving means (38) is oriented longitudinally or transversely with respect to the direction of movement (31) of the mover (20).

10. The apparatus as claimed in claim 1, characterized in that the container receiving means (38) is realized such that at least one container (36) situated in the container receiving means (38) is retained or released by movement of the mover (20).

11. The apparatus as claimed in claim 1, characterized in that at least one process station such as a closing station (50) and/or at least one weighing device (54, 56) and/or at least one inspection device (55) and/or one inlet (50) and/or one outlet (60) is provided and the drive surface (13) is developed such that the mover (20) moves at least the container receiving means (38) to at least between the filling station (48) and the process station (40, 50, 54, 55, 56, 60).

12. The apparatus as claimed in claim 1, characterized in that the mover (20) and/or the drive surface (13) include at least one means that generates a magnetic field.

13. The apparatus as claimed in claim 1, characterized in that the mover (20) is configured to be coupled magnetically to the drive surface (13).

14. The apparatus as claimed in claim 1, characterized in that the mover (20) moves a filled container (36) with pivoting or rotating in order to reduce sloshing of a product (35) filled in the container (36).

15. The apparatus as claimed in claim 1, characterized in that the mover (20) is rotated about a pivot point (33) by an angle (α) in relation to a rest position, wherein the angle (α) depends on a speed or an acceleration (a) of the mover (20).

16. The apparatus as claimed in claim 1, characterized in that at least one inlet, which includes at least one guide wheel (45) and/or one conveying screw (39), is provided for supplying the containers (36), wherein the mover (20) moves the container receiving means (38) for taking over the supplied containers (36) at the same speed as the inlet (39, 40, 45) supplies the containers (36).

17. The apparatus as claimed in claim 1, characterized in that the container receiving means (38) is realized such that at least one container (36) situated in the container receiving means (38) is retained or released by means of tilting of the mover (20).

18. The apparatus as claimed in claim 1, characterized in that the mover (20) and/or the drive surface (13) include a coil (18) and/or a magnet.

19. An apparatus for transporting a container relative to a filling station, including at least one filling station (48) for filing at least one container (36), at least one container receiving means (38) for transporting the container (36) relative to the filling station (48), at least one drive surface (13) and at least one mover (20) which is couplable to the drive surface (13), wherein the mover (20) is on the drive surface (13) so as to be displaceable in at least two degrees of freedom and/or rotatable relative to the drive surface (13), and wherein the container receiving means (38) is connected to the mover (20) for displacement and/or rotation therewith.

20. An apparatus for transporting a container relative to a filling station, including at least one filling station (48) for filing at least one container (36), at least one container receiving means (38) for transporting the container (36) relative to the filling station (48), at least one drive surface (13) and at least one mover (20) which is couplable to the drive surface (13), wherein the mover (20) is on the drive surface (13) so as to be displaceable in at least two degrees of freedom and/or rotatable, wherein the container receiving means (38) is connected to the mover (20), and wherein the mover (20) is rotated about a pivot point (33) by an angle (α) in order to reduce sloshing of a product (35) filled in the container, wherein the angle (α) depends on a speed or an acceleration (a) of the mover (20).

* * * * *